(12) United States Patent
Patou (10) Patent No.: US 11,892,315 B2
(45) Date of Patent: Feb. 6, 2024

(54) INFORMATION PROCESSOR

(71) Applicant: Faurecia Clarion Electronics Co., Ltd., Saitama (JP)

(72) Inventor: Yearlor Patou, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 165 days.

(21) Appl. No.: 17/510,710

(22) Filed: Oct. 26, 2021

(65) Prior Publication Data

US 2022/0136856 A1 May 5, 2022

(30) Foreign Application Priority Data

Nov. 2, 2020 (JP) ................. 2020-183463

(51) Int. Cl.
*G01C 21/36* (2006.01)
*G08G 1/0968* (2006.01)

(52) U.S. Cl.
CPC ... *G01C 21/3691* (2013.01); *G08G 1/096822* (2013.01); *G08G 1/096844* (2013.01)

(58) Field of Classification Search
CPC ............ G01C 21/3407; G01C 21/3453; G01C 21/3438; G01C 21/26; G01C 21/343; G01C 21/3446; G01C 21/3469; G01C 21/3492; G01C 21/3635; G01C 21/3691; G01C 21/3848; G01C 21/3867; G01C 21/3881; G01C 21/206; G01C 21/3415; G01C 21/3461; G01C 21/3484; G01C 21/3605; G01C 21/3614; G01C 21/3688; G01C 21/34; G01C 21/3626; G01C 21/3664; G01C 21/3822; G01C 21/3841; G01C 21/3878; G01C 21/3885; G01C 21/3896; G08G 1/22; G08G 1/20; G08G 1/0112; G08G 1/096775; G08G 1/096816; G08G 1/205; G08G 1/0129; G08G 1/0141; G08G 1/096725; G08G 1/096822; G08G 1/096844; G08G 1/096708; G08G 1/096741; G08G 1/096811; G08G 1/096866; G08G 1/0969; G08G 1/166; G08G 1/167; G08G 1/202

See application file for complete search history.

(56) References Cited

U.S. PATENT DOCUMENTS

2005/0093720 A1* 5/2005 Yamane ............ G01C 21/3492
340/995.13
2007/0155404 A1* 7/2007 Yamane ............ G08G 1/09685
455/456.1

FOREIGN PATENT DOCUMENTS

| JP | 2002-277268 A | | 9/2002 |
|---|---|---|---|
| JP | 2002277268 A | * | 9/2002 |
| JP | 2008102046 A | * | 5/2008 |

(Continued)

*Primary Examiner* — Maceeh Anwari
*Assistant Examiner* — Aarron E Santos
(74) *Attorney, Agent, or Firm* — IP Business Solutions, LLC (57) ABSTRACT

A congestion prediction server includes: a storage device configured to store route information of a determined route on which a vehicle is scheduled to travel; and a server control unit configured to, in a case of receiving route information of a searched route searched by an in-vehicle device loaded in the vehicle, generate reference information regarding the searched route based on the route information of the determined route and transmit the generated reference information to the in-vehicle device.

3 Claims, 9 Drawing Sheets

(56) References Cited

FOREIGN PATENT DOCUMENTS

| | | | | | |
|---|---|---|---|---|---|
| JP | 2009069160 | A | * | 4/2009 | ............. G01C 21/20 |
| JP | 2014219366 | A | * | 11/2014 | |
| JP | 2016106231 | A | * | 6/2016 | .......... B60L 11/1861 |

* cited by examiner

| TEMPORARY VEHICLE ID | LINK INFORMATION | VEHICLE CLASS | ROUTE CLASS | CURRENT POSITION INFORMATION | AZIMUTH INFORMATION | WEIGHTING FACTOR | PASSING SCHEDULED TIME |
|---|---|---|---|---|---|---|---|
| abcd | ROAD LINK NODE | AUTOMATIC DRIVING | AUTOMATIC DRIVING ROUTE | LATITUDE: LONGITUDE: | SOUTHWEST | Wh | SECTION1: 12:15 SECTION2: 12:20 |
| stuv | ROAD LINK NODE | ... | ... | ... | ... | ... | ... |

| CONGESTION OCCURRENCE SECTION | CONGESTION OCCURRENCE TIME PERIOD | CONGESTION DISTANCE | CONGESTION PROBABILITY | TEMPORARY VEHICLE ID |
|---|---|---|---|---|
| SECTION A ~ SECTION D | 16:25~17:53 | 2.5km | 90% | abcd,defg,··· |
| ... | ... | ... | ... | ... |

INFORMATION PROCESSOR

INCORPORATION BY REFERENCE

The present application claims priority under 35 U.S.C. § 119 to Japanese Patent Application No. 2020-183463 filed on Nov. 2, 2020. The content of the application is incorporated herein by reference in its entirety.

BACKGROUND OF THE INVENTION

Field of the Invention

The present invention relates to an information processor.

Description of the Related Art

Conventionally, a system for avoiding congestion has been proposed. For example, Japanese Patent Laid-Open No. 2002-277268 discloses a congestion avoiding system including a navigation device loaded in a vehicle and a server device communicable with the navigation device, in which the navigation device includes a route searching means which searches for a route from a current location of the vehicle to a destination and a navigation side communication means which transmits information of the searched route to the server device.

However, there is a case where the information of the route searched by the navigation device and a traveling route on which the vehicle actually travels are different, and congestion prediction accuracy declines.

The present invention is implemented in consideration of the situation described above, and an object is to provide an information processor which prevents decline of congestion prediction accuracy.

SUMMARY OF THE INVENTION

In order to solve the problem described above, the information processor of an aspect of the present invention includes: a communication unit; a storage unit; and a control unit configured to, in a case of receiving route information of a scheduled route on which a vehicle is scheduled to travel, make the storage unit store the received route information of the scheduled route, and in a case of receiving route information of a searched route searched by an in-vehicle device loaded in the vehicle, generate reference information regarding congestion of the searched route based on the route information of the scheduled route and transmit the generated reference information to the in-vehicle device.

According to the aspect of the present invention, congestion occurrence can be highly accurately predicted.

DETAILED DESCRIPTION OF THE PREFERRED EMBODIMENT

Hereinafter, an embodiment of the present invention will be described with reference to attached drawings.

Figure 1:
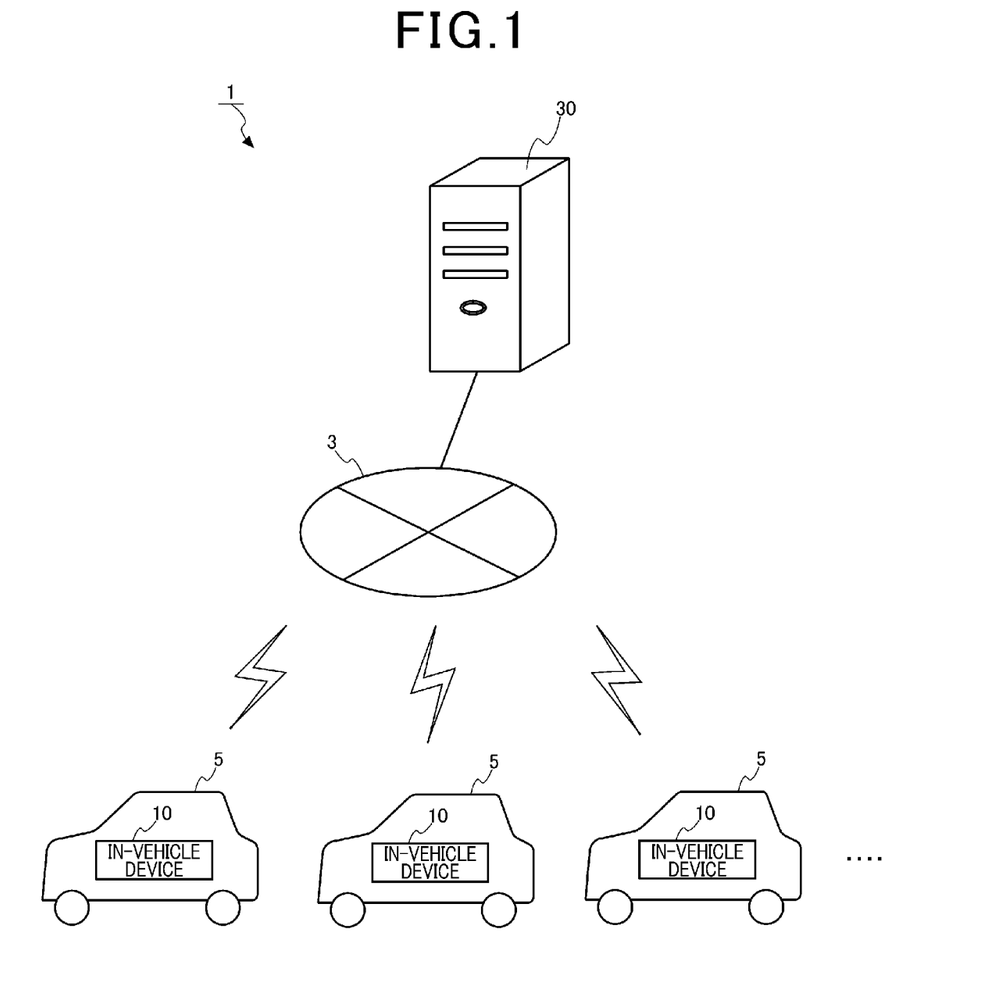
FIG. 1 is a system configuration diagram of a congestion prediction system.

FIG. 1 is a system configuration diagram of a congestion prediction system 1.

The congestion prediction system 1 includes an in-vehicle device 10 loaded in a vehicle 5 and a congestion prediction server 30 which predicts congestion occurrence, and the devices are data communicable with each other via a communication network 3. The congestion prediction server 30 corresponds to an information processor of the present invention.

The in-vehicle device 10 searches for a traveling route to a destination set by an occupant of the vehicle 5. The traveling route searched by the in-vehicle device 10 is referred to as a searched route hereinafter. The in-vehicle device 10 transmits searched route information which is information regarding the searched route to the congestion prediction server 30.

When the searched route information is received from the in-vehicle device 10, the congestion prediction server 30 determines whether or not congestion is to occur on the received searched route. In the case of determining that the congestion is to occur on the searched route, the congestion prediction server 30 searches for an avoiding route and transmits the searched avoiding route to the in-vehicle device 10.

When the avoiding route is received from the congestion prediction server 30, the in-vehicle device 10 displays the received avoiding route at a display unit, and lets an occupant select a route on which the vehicle 5 is to be made to actually travel. Hereinafter, the route that is selected by the occupant and that the vehicle 5 is scheduled to actually travel on is referred to as a determined route. The in-vehicle device 10 transmits determined route information which is the information regarding the determined route to the congestion prediction server 30.

Figure 2:
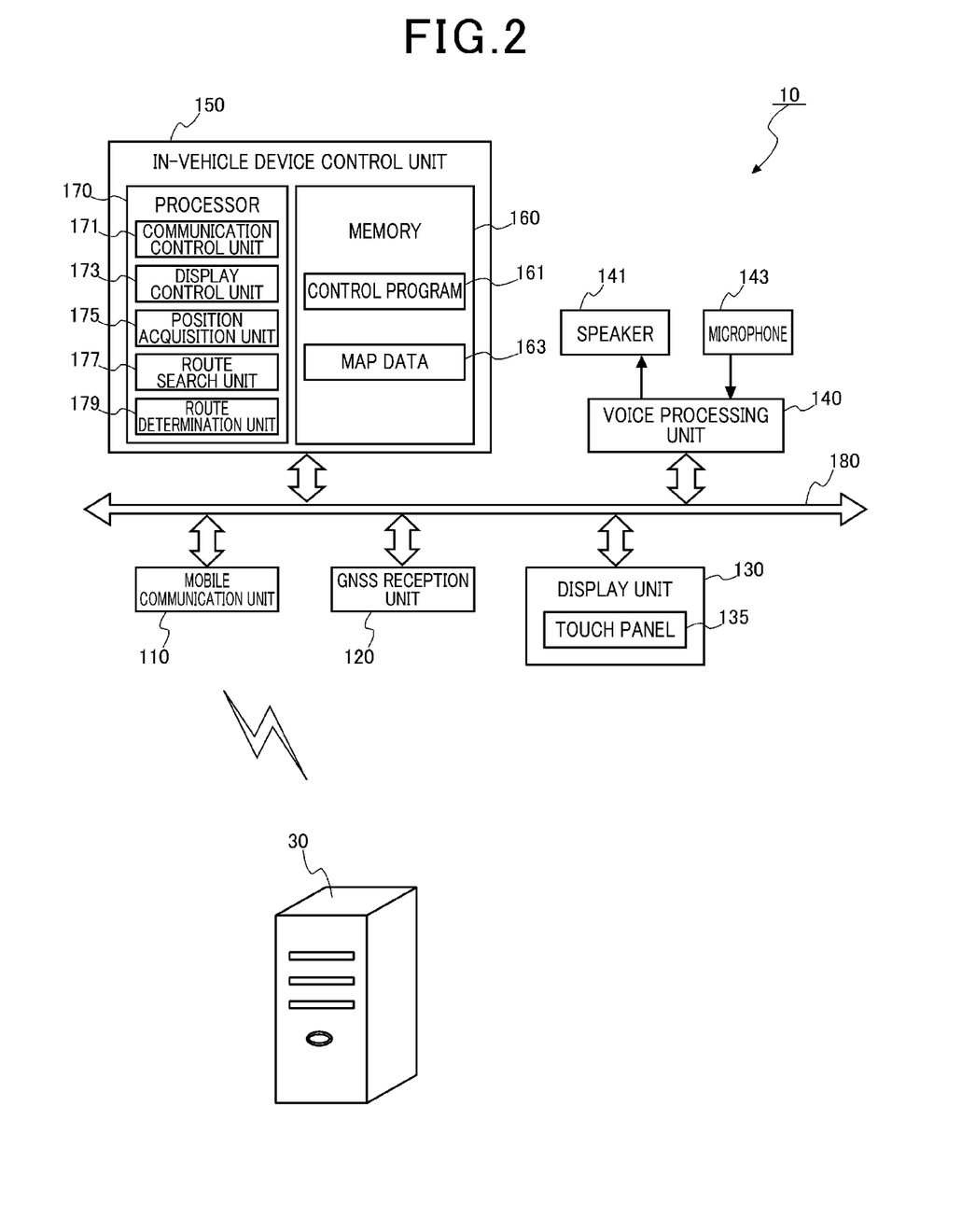
FIG. 2 is a block diagram illustrating the configuration of an in-vehicle device.

FIG. 2 is a block diagram illustrating a configuration of the in-vehicle device 10.

The configuration of the in-vehicle device 10 will be described with reference to FIG. 2.

The in-vehicle device 10 includes a mobile communication unit 110, a GNSS (Global Navigation Satellite System) reception unit 120, a display unit 130, a voice processing unit 140 and an in-vehicle device control unit 150, and the respective units are connected via a bus 180.

The mobile communication unit 110 includes an antenna and a wireless communication circuit or the like (illustrations are omitted for all), and performs mobile communication via a mobile communication network. The mobile communication network is one of communication networks constituting the communication network 3.

The GNSS reception unit 120 includes a receiver which receives GNSS signals transmitted from a positioning satellite and a processor which computes latitude and longitude as a position of the vehicle 5 based on the received GNSS signals. The illustrations of the receiver and the processor are omitted. The GNSS reception unit 120 outputs the latitude and the longitude obtained by computation, the latitude and the longitude indicating the position of the vehicle 5, to the in-vehicle device control unit 150.

The display unit 130 includes a touch panel 135 including a display panel and a touch sensor. For the display panel, for example, a liquid crystal display, an organic EL display or the like is used. For the touch sensor, a sensor of a generally known system such as a resistive membrane system or an electrostatic capacity system is used. The touch sensor detects a touch operation performed to the display panel, and generates operation signals indicating an operation position of the detected touch operation. The touch sensor outputs the generated operation signals to the in-vehicle device control unit 150.

The voice processing unit 140 is connected to a speaker 141 and a microphone 143, and modulates and demodulates voice signals. The voice processing unit 140 modulates the voice signals inputted from the microphone 143, and outputs the modulated voice signals to the in-vehicle device control unit 150. In addition, the voice processing unit 140 demodulates the voice signals and outputs the demodulated voice signals to the speaker 141. The voice processing unit 140 is achieved by a processor for voice processing for example.

The in-vehicle device control unit 150 is a computer device including a memory 160 and a processor 170.

The memory 160 includes a semiconductor storage device such as a ROM (Read Only Memory) or a RAM (Random Access Memory), for example. In addition, the memory 160 may be constituted by a nonvolatile semiconductor storage device such as a flash memory or an EEPROM (Electrically Erasable Programmable Read-Only Memory).

The memory 160 stores a control program 161 to be executed by the processor 170, and map data 163 to be used to search for the traveling route.

The processor 170 is constituted by a CPU (Central Processing Unit) or an MPU (Microprocessor Unit) or the like. The processor 170 executes the control program 161 and controls operations of the respective units constituting the in-vehicle device 10.

The in-vehicle device control unit 150 includes, as functional configurations, a communication control unit 171, a display control unit 173, a position acquisition unit 175, a route search unit 177 and a route determination unit 179. The functional configurations are functions achieved by the processor 170 executing a computer program and performing the computation.

The communication control unit 171 is connected to the communication network 3 by controlling the mobile communication unit 110, and performs data communication with the congestion prediction server 30.

The display control unit 173 outputs display data to be displayed on the touch panel 135 to the display unit 130. The display unit 130 displays an image based on the display data on the touch panel 135. The image displayed on the touch panel 135 includes a map of surrounding areas of the vehicle 5 and the traveling route superimposed and displayed on the map or the like.

To the position acquisition unit 175, the latitude and the longitude calculated by the GNSS reception unit 120, the latitude and the longitude indicating the position of the vehicle 5, are inputted. The position acquisition unit 175 corrects the inputted latitude and longitude by well-known or widely-known dead reckoning, and calculates the latitude and longitude indicating the position of the vehicle 5. The position acquisition unit 175 outputs the calculated latitude and longitude to the communication control unit 171. The communication control unit 171 generates in-vehicle device information including the inputted latitude and longitude, an information identifier and a temporary vehicle ID, and transmits the generated in-vehicle device information to the congestion prediction server 30. The information identifier is identification information which identifies information included in the in-vehicle device information transmitted to the congestion prediction server 30 by the in-vehicle device 10. The temporary vehicle ID is an ID including the identification information set to the in-vehicle device 10, and is information which uniquely identifies the vehicle 5 traveling with the in-vehicle device 10 loaded therein.

The route search unit 177 refers to the map data 163 and searches for the traveling route to the destination set by the occupant. The traveling route searched by the route search unit 177 is referred to as the searched route. The route search unit 177 outputs the searched route information which is the information of the searched route to the communication control unit 171. The communication control unit 171 generates the in-vehicle device information including the inputted searched route information, and transmits the generated in-vehicle device information to the congestion prediction server 30.

In the in-vehicle device information, the searched route information includes link information, a vehicle class and azimuth information. The in-vehicle device information includes the information identifier and the temporary vehicle ID in addition to the searched route information.

The link information is the information regarding road links and nodes constituting the searched route. The road link means a road section between the node and the node. The node is a point connecting the road link and the road link, or a point which separates the road link and the road link. The node includes one or more intersections.

The vehicle class is the information which distinguishes a traveling form and a kind of the vehicle 5. The traveling form of the vehicle 5 includes automatic driving and manual driving. The kind of the vehicle 5 includes a large vehicle and a general vehicle. The vehicle class corresponds to a vehicle type of the present invention.

In the case where the vehicle class is the automatic driving, the vehicle is classified into the automatic driving regardless of the vehicle type such as the large vehicle and the general vehicle. The large vehicle is a large-sized vehicle such as a bus and a truck. The general vehicle is the vehicle other than the large vehicle. The vehicle 5 the vehicle class of which is classified into the large vehicle and the general vehicle is the vehicle 5 of the manual driving, which is made to travel by driver's driving.

The azimuth information is an azimuth of the destination based on a departure place of the searched route, which is a current position of the vehicle 5.

In the case of receiving the avoiding route from the congestion prediction server 30 as a result of transmitting the searched route information to the congestion prediction server 30, the route determination unit 179 makes the received avoiding route be displayed on the touch panel 135 by control of the display control unit 173. In the case where the avoiding route is selected by the occupant, the route determination unit 179 determines the selected avoiding route as the route on which the vehicle 5 is to be made to travel. In addition, in the case where the avoiding route is not received from the congestion prediction server 30 or in the case where the avoiding route is not selected by the occupant, the route determination unit 179 determines the searched route as the route on which the vehicle 5 is to be made to travel. The route determination unit 179 outputs the determined route information which is the information of the determined route to the communication control unit 171.

The communication control unit 171 generates the in-vehicle device information including the determined route information, the information identifier and the temporary vehicle ID, and transmits the generated in-vehicle device information to the congestion prediction server 30.

Figure 3:
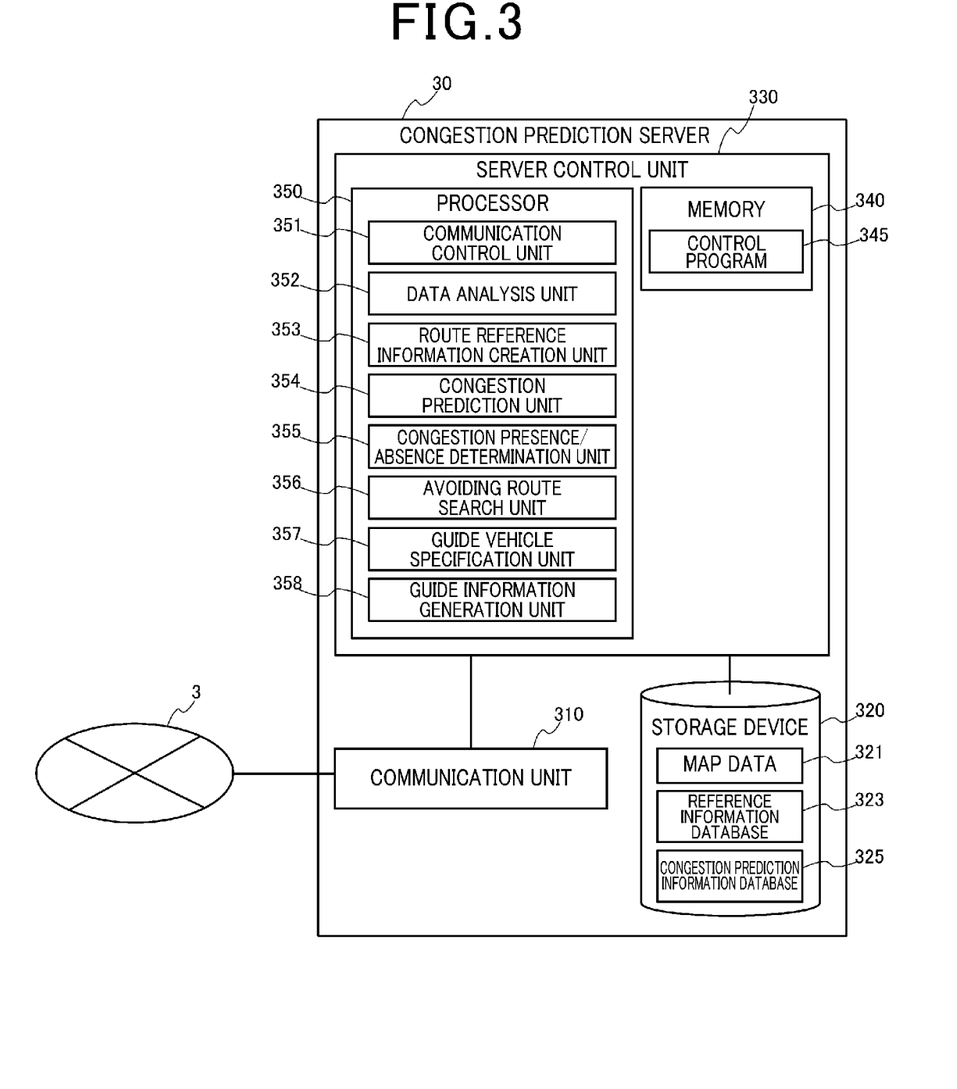
FIG. 3 is a block diagram illustrating the configuration of a congestion prediction server.

FIG. 3 is a block diagram illustrating the configuration of the congestion prediction server 30.

Next, the configuration of the congestion prediction server 30 will be described with reference to FIG. 3.

The congestion prediction server 30 includes a communication unit 310 (transmitter/receiver, circuit), a storage device 320 (memory) and a server control unit 330.

The communication unit 310 is connected to the communication network 3 by a network such as a LAN (Local Area Network), and performs the data communication with other devices connected to the communication network 3.

The storage device 320 corresponds to a storage unit of the present invention, and is constituted by, for example, an auxiliary storage device such as an HDD (Hard Disk Drive) or an SSD (Solid State Drive). The storage device 320 stores map data 321 used for a route search, and a reference information database 323 and a congestion prediction information database 325 generated by the server control unit 330. Details of the reference information database 323 and the congestion prediction information database 325 will be described later.

The server control unit 330 is a computer device including a memory 340 and a processor 350.

The memory 340 is constituted by a semiconductor storage device such as a ROM or a RAM, for example. In addition, the memory 340 may further include a nonvolatile semiconductor storage device such as a flash memory or an EEPROM. The memory 340 stores a control program 345 to be executed by the processor 350.

The processor 350 is constituted by a CPU or an MPU or the like. The processor 350 executes the control program 345 and controls the respective units constituting the congestion prediction server 30.

The server control unit 330 includes, as the functional configurations, a communication control unit 351, a data analysis unit 352, a route reference information creation unit 353, a congestion prediction unit 354, a congestion presence/absence determination unit 355, an avoiding route search unit 356, a guide vehicle specification unit 357 and a guide information generation unit 358. The functional configurations are the functions achieved by the processor 350 executing the computer program and performing the computation.

Figure 4:
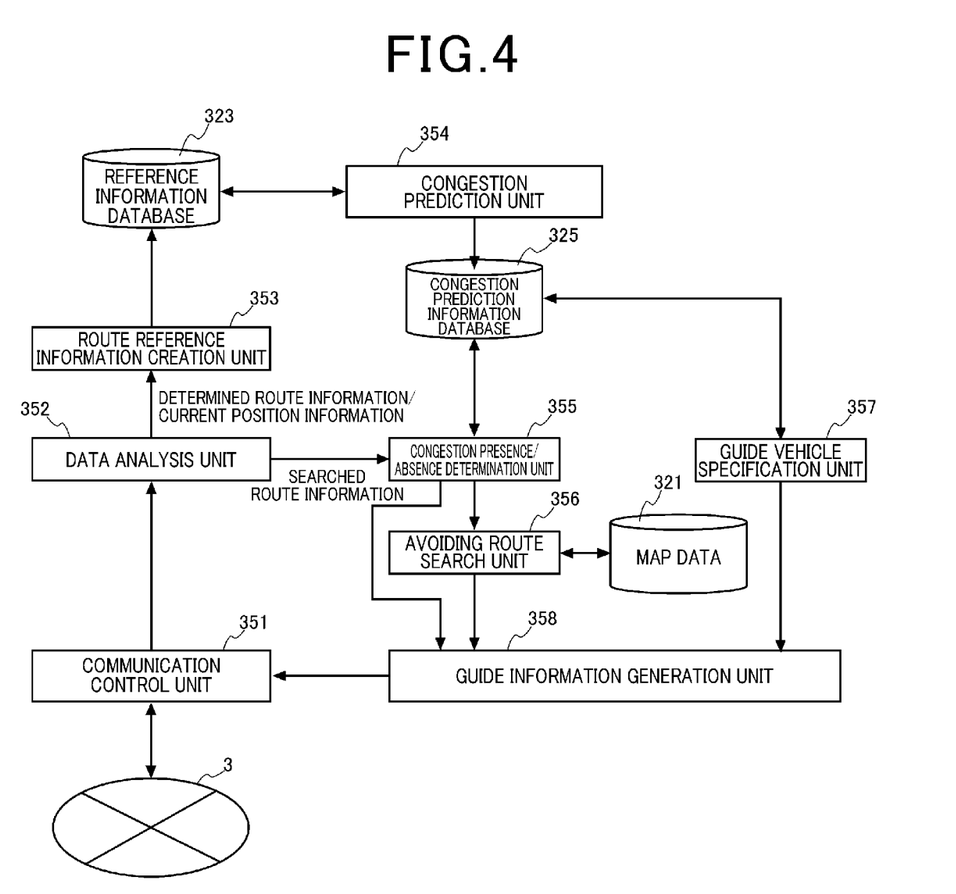
FIG. 4 is a diagram illustrating a flow of processing of a server control unit and a flow of data.

FIG. 4 is a diagram illustrating a flow of processing of the server control unit 330 and a flow of data.

The operation of the server control unit 330 will be described with reference to FIG. 4.

The communication control unit 351 is connected to the communication network 3 by controlling the communication unit 310, and mutually performs the data communication with the in-vehicle device 10. The communication control unit 351 outputs the in-vehicle device information received by the communication unit 310 to the data analysis unit 352.

The data analysis unit 352 refers to the information identifier included in the inputted in-vehicle device information, and determines whether the information included in the in-vehicle device information is the searched route information, the determined route information or current position information.

In the case where the information included in the in-vehicle device information is the determined route information or the current position information, the data analysis unit 352 outputs the in-vehicle device information to the route reference information creation unit 353. In addition, in the case where the information included in the in-vehicle device information is the searched route information, the data analysis unit 352 outputs the in-vehicle device information to the congestion presence/absence determination unit 355.

To the route reference information creation unit 353, the determined route information or the current position information is inputted from the data analysis unit 352.

In the case where the inputted in-vehicle device information is the determined route information, the route reference information creation unit 353 creates route reference information based on the determined route information.

The route reference information creation unit 353 sets a weighting factor of the determined route first. The weighting factor is a factor indicating easiness of route change, and is set based on the vehicle class and a route class.

In the present embodiment, the case of using three factors that are a first weighting factor, a second weighting factor and a third weighting factor as the weighting factor will be described, however, further more weighting factors may be used. Values of the weighting factors are set to be larger in an order of the first weighting factor>the second weighting factor>the third weighting factor. The first weighting factor, the second weighting factor and the third weighting factor are parameters determined by statistical information.

In the case where the vehicle class is the automatic driving and the route class is the automatic driving, the route reference information creation unit 353 sets the first weighting factor as the weighting factor of the determined route. In the case of the automatic driving, since the traveling route is not easily changed, the first weighting factor is set.

In the case where the vehicle class is the large vehicle and the route class is a large route where a large bus and a truck travel, the route reference information creation unit 353 sets the first weighting factor as the weighting factor. For the large route where the large bus and the truck travel, since a possibility of the route change is low compared to the general vehicle which is a private vehicle, the first weighting factor is set.

In the case where the vehicle class is the general vehicle and the route class is an established route, the route reference information creation unit 353 sets the first weighting factor as the weighting factor of the determined route. The established route is a route for which the route change is impossible without presence of an alternative route. Therefore, the route reference information creation unit 353 sets the first weighting factor as the weighting factor of the determined route.

In the case where the vehicle class is the general vehicle and the route class is a route giving priority to expressways, the route reference information creation unit 353 sets the second weighting factor as the weighting factor of the determined route. For the route giving priority to the expressways, the possibility of traveling on the expressway is high but the possibility of the route change is lower than that for the established route. Therefore, the route reference information creation unit 353 sets the second weighting factor as the weighting factor of the determined route.

In the case where the vehicle class is the general vehicle and the route class is a route giving priority to general roads, the route reference information creation unit 353 sets the third weighting factor as the weighting factor of the determined route. For the route giving priority to the general roads, the route change is easy. Therefore, the route reference information creation unit 353 sets the third weighting factor as the weighting factor of the determined route.

Next, the route reference information creation unit 353 sets an average traveling speed for the determined route. In the case where the determined route includes a section of traveling on the expressway, the route reference information creation unit 353 sets a traveling speed for the section of traveling on the expressway at the average traveling speed for the expressway. In addition, in the case where the determined route includes a section of traveling on the general road, the traveling speed for the section of traveling on the general road is set at the average traveling speed for the general road.

However, since the current position information is received from the in-vehicle device 10 of the vehicle 5 after the vehicle 5 starts traveling, the route reference information creation unit 353 calculates the traveling speed of the vehicle 5 based on the current position information, and sets the average traveling speed based on the calculated traveling speed.

Figure 5:
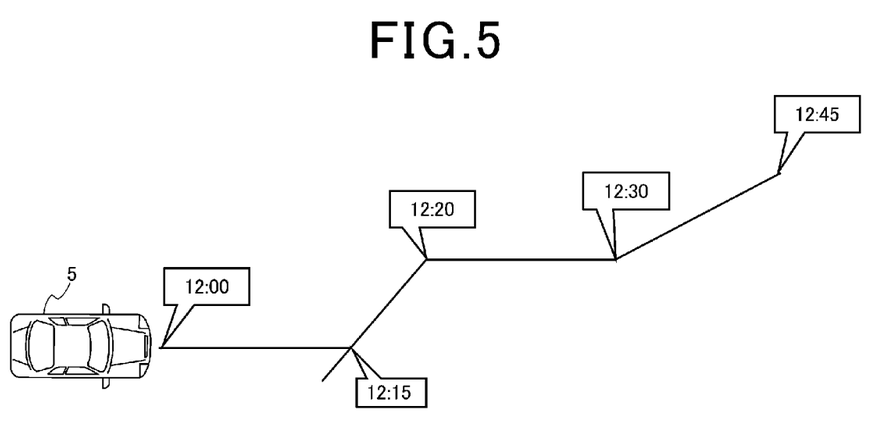
FIG. 5 is a diagram illustrating a passing scheduled time for each section.

FIG. 5 is a diagram illustrating a passing scheduled time for each section.

Next, the route reference information creation unit 353 calculates the passing scheduled time for each section based on the set average traveling speed. Here, the section is the road link or the section of a preset length. The length of the road link is not fixed and there are short sections and long sections. Therefore, in the case where the length of the road link is longer than a fixed value, the route reference information creation unit 353 divides the road link into a plurality of sections, and calculates the passing scheduled time for each divided section. In addition, in the case where the length of the road link is shorter than the fixed value, the route reference information creation unit 353 defines the plurality of road links as one section, and calculates the passing scheduled time of the section.

Figure 6:
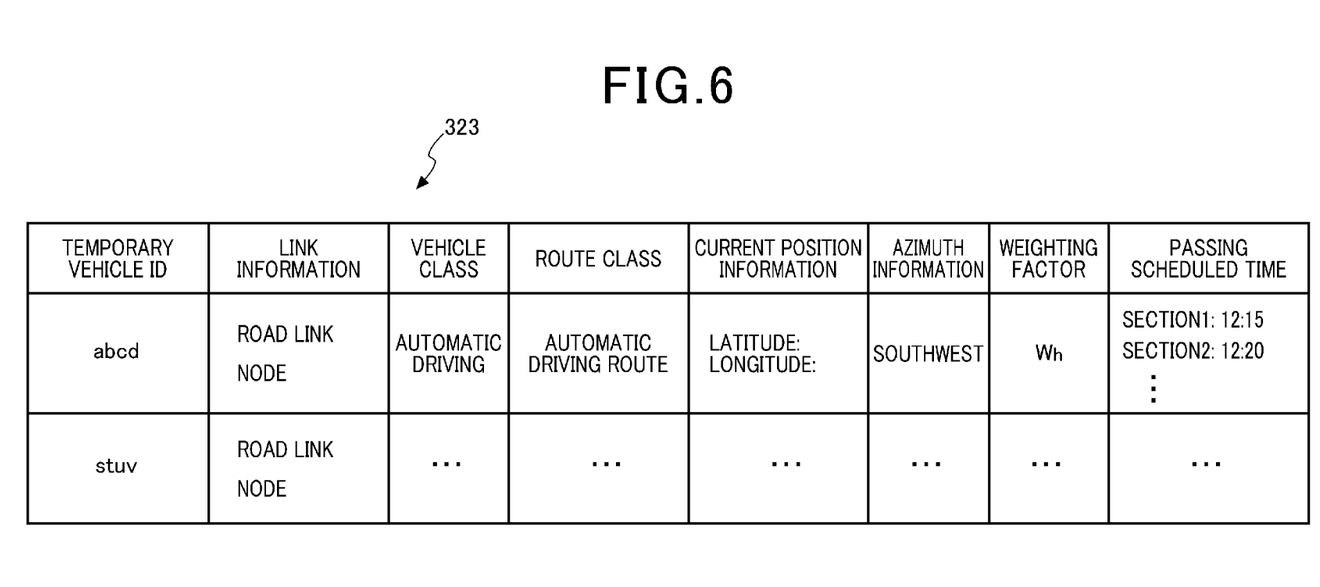
FIG. 6 is a diagram illustrating the configuration of a reference information database.

FIG. 6 is a diagram illustrating the configuration of the reference information database 323.

When the route reference information is created, the route reference information creation unit 353 registers the created route reference information as one record of the reference information database 323. The route reference information includes the temporary vehicle ID, the link information, the vehicle class, the route class, the current position information, the azimuth information, the weighting factor and the passing scheduled time. For the passing scheduled time, the passing scheduled time for each section is registered.

In addition, in the case where the inputted in-vehicle device information is the current position information, the route reference information creation unit 353 registers the inputted current position information in the reference information database 323, or updates the current position information registered in the reference information database 323.

Figure 7:
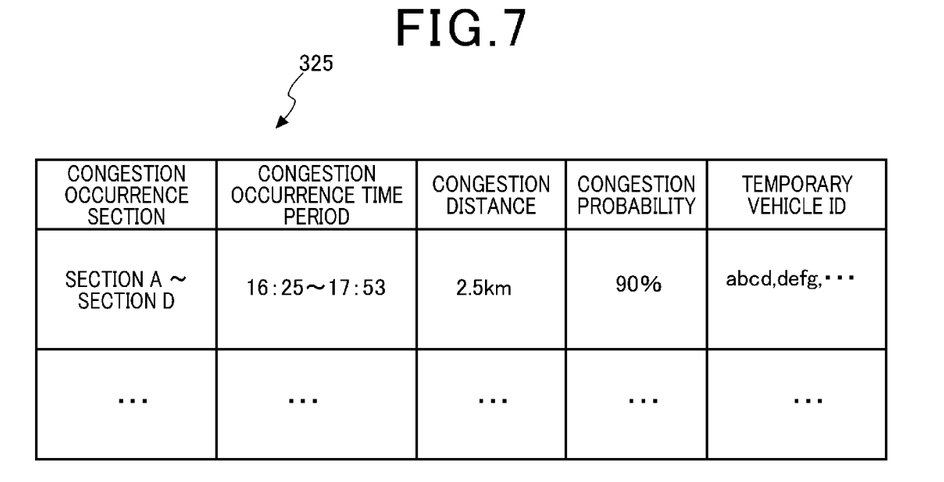
FIG. 7 is a diagram illustrating the configuration of a congestion prediction information database.

FIG. 7 is a diagram illustrating the configuration of the congestion prediction information database 325.

The congestion prediction unit 354 generates congestion prediction information. The congestion prediction unit 354 generates the congestion prediction information by predicting the congestion occurrence for each preset time. The congestion prediction unit 354 registers the generated congestion prediction information as one record of the congestion prediction information database 325.

One record of the congestion prediction information database 325 includes a congestion occurrence section, a congestion occurrence time period, a congestion distance, a congestion probability and the temporary vehicle ID.

The congestion occurrence section is the information indicating the section where the congestion occurrence is predicted.

The congestion occurrence time period is the information indicating a time period during which the congestion occurrence in the congestion occurrence section is predicted.

The congestion distance is the information indicating the length of the congestion occurrence section.

The congestion probability is a congestion occurrence probability in consideration of reliability of the determined route. The reliability of the determined route is the information indicating whether or not the vehicle 5 for which the determined route is determined is to actually travel on the determined route.

The temporary vehicle ID is the ID which identifies the in-vehicle device 10 of the vehicle 5 scheduled to travel through the congestion occurrence section in the congestion occurrence time period.

Next, a method of predicting the congestion occurrence section will be described.

First, the congestion prediction unit 354 acquires the route reference information registered in the reference information database 323. The congestion prediction unit 354 refers to the passing scheduled time for each section from the acquired route reference information, and specifies the determined route for which the road link indicated by the link information and the passing scheduled time of the road link overlap.

In the following description, the first weighting factor is referred to as Wh, the second weighting factor is referred to as Wm and the third weighting factor is referred to as Wl. It is assumed that Wh>Wm>Wl, and the value of Wh is "1".

In a time period t and a section s, the number of the vehicles 5 for which the weighting factor is the first weighting factor Wh is referred to as $n_h[t,s]$. The time period t indicates, for example, a preset duration such as five minutes or ten minutes.

The number $N_h[t,s]$ of the vehicles 5 in consideration of the weighting factor is calculated by an expression (1) below.

$$N_h[t,s] = Wh \times n_h[t,s] \tag{1}$$

Similarly, when the number of the vehicles 5 of the second weighting factor Wm in the time period t and the section s is $n_m[t,s]$ and the number of the vehicles 5 of the third weighting factor Wl in the time period t is $n_l[t,s]$, the numbers $N_m[t,s]$ and $N_l[t,s]$ of the vehicles 5 in consideration of the weighting factor are calculated by expressions (2) and (3) below respectively.

$$N_m[t,s] = Wm \times n_m[t,s] \tag{2}$$

$$N_l[t,s] = Wl \times n_l[t,s] \tag{3}$$

By the above-described expressions (1), (2) and (3), the number $T_t$ of the vehicles 5 in the time period t and the section s is indicated by an expression (4) below.

$$T_t = N_h[t,s] + N_m[t,s] + N_l[t,s] \tag{4}$$

The number Tt of the vehicles 5 in the time period t is referred to as a congestion determination value T[t,s] hereinafter.

Next, the congestion determination value T[t,s] obtained by the expression (4) above is compared with a congestion reference value $T_{thresh}$ which is a reference value for determining congestion. The congestion reference value $T_{thresh}$ is the value determined based on the statistical information.

In the case where the congestion determination value T[t,s] satisfies an expression (5) below, the congestion prediction unit 354 determines that the congestion will not occur. A value "k" indicated in the expression (5) and expressions (6) and (7) shown below is an arbitrary natural number. The value "k" is the value for allowing the congestion reference value $T_{thresh}$ to have flexibility of determination. That is, the value "k" is the value for preventing a determination result of the congestion prediction unit 354 from being changed by a little increase/decrease of the vehicles 5 when the value of the congestion determination value T[t,s] approaches the value of the congestion reference value $T_{thresh}$.

$$T[t,s] < T_{thresh} - k \quad (5)$$

In addition, in the case where the congestion determination value T[t,s] satisfies the expression (6) below, the congestion prediction unit 354 determines that the congestion will occur with the probability of 50%.

$$T_{thresh} - k \leq T[t,s] \leq T_{thresh} + k \quad (6)$$

Further, in the case where the congestion determination value T[t,s] satisfies the expression (7) below, the congestion prediction unit 354 determines that the congestion will occur.

$$T[t,s] > T_{thresh} + k \quad (7)$$

Note that the congestion prediction unit 354 may determine whether or not the congestion will occur by simple comparison between the congestion determination value T[t,s] and the congestion reference value $T_{thresh}$. That is, in the case where the congestion determination value T[t,s] is equal to or larger than the congestion reference value $T_{thresh}$, the congestion prediction unit 354 determines that the congestion will occur. In addition, in the case where the congestion determination value T[t,s] is smaller than the congestion reference value $T_{thresh}$, the congestion prediction unit 354 determines that the congestion will not occur.

Next, a calculation method of the congestion occurrence probability will be described.

The value of the congestion occurrence probability in the time period t and the section s is referred to as P[t,s].

The congestion prediction unit 354 calculates the congestion occurrence probability P[t,s] based on a ratio of the congestion determination value T[t,s] to the congestion reference value $T_{thresh}$. The congestion occurrence probability P[t,s] is determined based on expressions (8)-(14) below, for example.

$$\text{When } T[t,s] < 0.8 T_{thresh}, P[t,s] = 0\% \quad (8)$$

$$\text{When } 0.8 T_{thresh} \leq T[t,s] < 1.2 T_{thresh}, P[t,s] = 50\% \quad (9)$$

$$\text{When } 1.2 T_{thresh} \leq T[t,s] < 1.4 T_{thresh}, P[t,s] = 60\% \quad (10)$$

$$\text{When } 1.4 T_{thresh} \leq T[t,s] < 1.6 T_{thresh}, P[t,s] = 70\% \quad (11)$$

$$\text{When } 1.6 T_{thresh} \leq T[t,s] < 1.8 T_{thresh}, P[t,s] = 80\% \quad (12)$$

$$\text{When } 1.8 T_{thresh} \leq T[t,s] < 2 T_{thresh}, P[t,s] = 90\% \quad (13)$$

$$\text{When } 2 T_{thresh} \leq T[t,s], P[t,s] = 100\% \quad (14)$$

The congestion prediction unit 354 registers the section (congestion occurrence section) for which it is determined that the congestion will occur, the time period (congestion occurrence time period) for which it is determined that the congestion will occur, the congestion distance and the congestion probability in the congestion prediction information database 325. In addition, the congestion prediction unit 354 registers the temporary vehicle ID of the vehicle 5 scheduled to travel through the congestion occurrence section in the congestion occurrence time period in the congestion prediction information database 325.

Next, the congestion presence/absence determination unit 355 will be described.

To the congestion presence/absence determination unit 355, the searched route information is inputted from a data analysis unit 352 as in-vehicle device information.

The congestion presence/absence determination unit 355 sets the average traveling speed for the searched route first. In the case where the searched route includes the section of traveling on the expressway, the congestion presence/absence determination unit 355 sets the traveling speed for the section at the average traveling speed for the expressway. In addition, in the case where the determined route includes the section of traveling on the general road, the traveling speed for the section is set at the average traveling speed for the general road.

Then, the congestion presence/absence determination unit 355 calculates the passing scheduled time for each section included in the searched route using the set average traveling speed. In the case where the length of the road link of the link information included in the searched route information is longer than a fixed length, the congestion presence/absence determination unit 355 divides the road link into the plurality of sections, and calculates the passing scheduled time for each divided section. In addition, in the case where the length of the road link is shorter than the fixed length, the congestion presence/absence determination unit 355 defines the plurality of road links as one section, and calculates the passing scheduled time of the section.

Next, the congestion presence/absence determination unit 355 acquires the congestion prediction information from the congestion prediction information database 325. The congestion presence/absence determination unit 355 determines whether or not the searched route is the route to travel through the congestion occurrence section in the congestion occurrence time period based on the acquired congestion prediction information. In the case of determining that the searched route is the route to travel through the congestion occurrence section in the congestion occurrence time period, the congestion presence/absence determination unit 355 outputs the searched route information and the information of the congestion occurrence section that the searched route is scheduled to travel through to the avoiding route search unit 356.

In addition, in the case of determining that the searched route is not the route to travel through the congestion occurrence section in the congestion occurrence time period, the congestion presence/absence determination unit 355 notifies the guide information generation unit 358 of a determination result that the congestion occurrence section is not included in the searched route.

When the searched route information and the information of the congestion occurrence section that the searched route is to travel are inputted from the congestion presence/absence determination unit 355, the avoiding route search unit 356 refers to the information and the map data 321 and searches for the avoiding route which avoids the congestion occurrence section. The avoiding route search unit 356 outputs a notice that the congestion occurrence section is included in the searched route and the information of the searched avoiding route to the guide information generation unit 358.

The guide vehicle specification unit 357 acquires the congestion prediction information from the congestion prediction information database 325. The guide vehicle specification unit 357 takes out the temporary vehicle ID from the acquired congestion prediction information, and outputs the taken-out temporary vehicle ID to the guide information generation unit 358 for each fixed time.

The guide information generation unit 358 generates guide information to be transmitted to the in-vehicle device 10 which is a transmission origin of the searched route information. The guide information corresponds to reference information of the present invention.

In the case where it is determined by the congestion presence/absence determination unit 355 that the searched route is the route to travel through the congestion occurrence section, the guide information generation unit 358 generates the guide information including the congestion occurrence section, the congestion occurrence time period, the congestion distance, the congestion probability and the information indicating the avoiding route searched by the avoiding route search unit 356 or the like. The guide information generation unit 358 outputs the generated guide information to the communication control unit 351. The communication control unit 351 transmits the inputted guide information to the in-vehicle device 10.

In addition, in the case where it is determined by the congestion presence/absence determination unit 355 that the searched route is the route not to travel through the congestion occurrence section, the guide information generation unit 358 generates the guide information indicating that the searched route is not to travel through the congestion occurrence section, and outputs the generated guide information to the communication control unit 351. The communication control unit 351 transmits the inputted guide information to the in-vehicle device 10.

Further, to the guide information generation unit 358, the temporary vehicle ID is inputted from the guide vehicle specification unit 357. The guide information generation unit 358 generates the guide information to be transmitted to the in-vehicle device 10 of the inputted temporary vehicle ID. The guide information includes the congestion occurrence section, the congestion occurrence time period, the congestion distance and the congestion probability or the like. The guide information generation unit 358 outputs the generated guide information to the communication control unit 351. The communication control unit 351 transmits the inputted guide information to the in-vehicle device 10.

Figure 8:
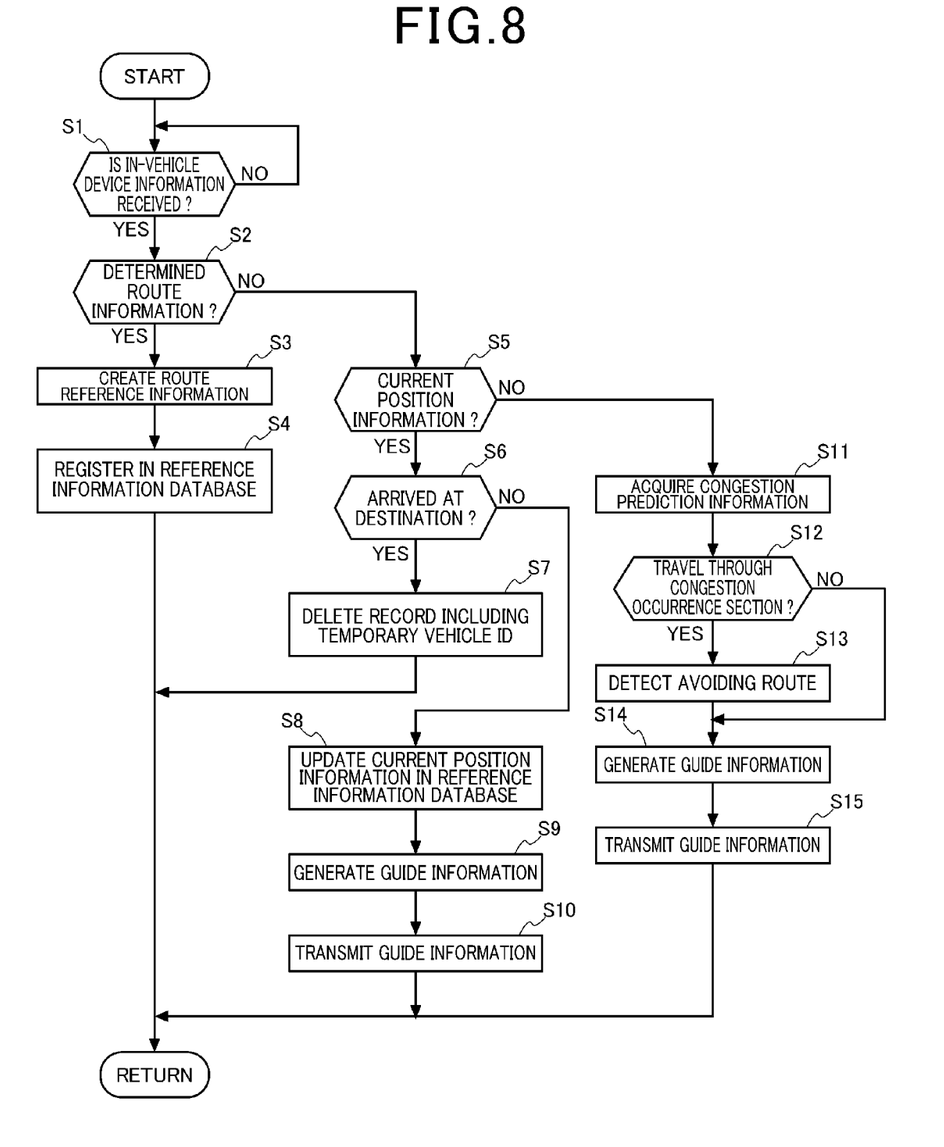
FIG. 8 is a flowchart illustrating an operation of the congestion prediction server.
Figure 9:
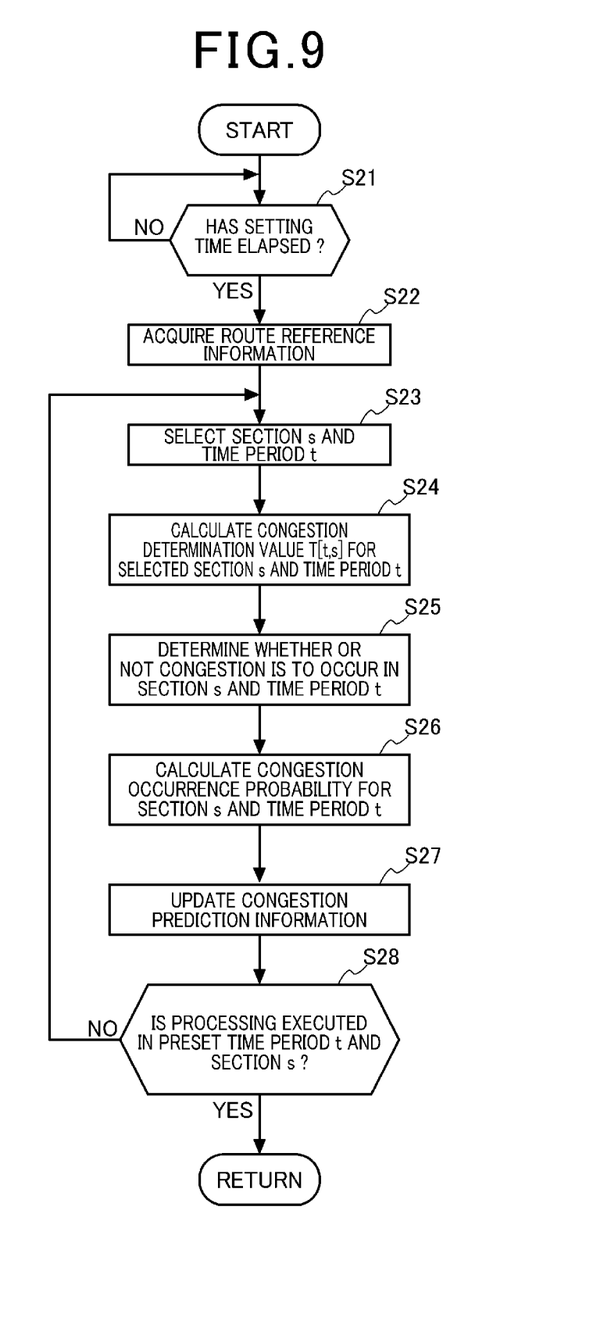
FIG. 9 is a flowchart illustrating the operation of the congestion prediction server.

FIG. 8 and FIG. 9 are flowcharts illustrating the operation of the congestion prediction server 30.

The operation of the congestion prediction server 30 will be described with reference to FIG. 8 and FIG. 9.

First, the server control unit 330 determines whether or not the in-vehicle device information is received (step S1). In the case where the in-vehicle device information is not received (step S1/NO), the server control unit 330 stands by until the in-vehicle device information is received.

In the case where the in-vehicle device information is received (step S1/YES), the server control unit 330 determines whether or not the received in-vehicle device information is the determined route information (step S2). In the case where the received in-vehicle device information is the determined route information (step S2/YES), the server control unit 330 creates the route reference information (step S3), and registers the created route reference information in the reference information database (step S4). Thereafter, the server control unit 330 returns to determination in step S1.

In addition, in the case where the received in-vehicle device information is not the determined route information (step S2/NO) and is the current position information (step S5/YES), the server control unit 330 first determines whether or not the vehicle 5 loaded with the in-vehicle device 10 has reached the destination by the received current position information (step S6).

In the case where the vehicle 5 loaded with the in-vehicle device 10 has reached the destination (step S6/YES), the server control unit 330 deletes the record including the temporary vehicle ID from the reference information database 323 and the congestion prediction information database 325 (step S7).

In the case where the vehicle 5 loaded with the in-vehicle device 10 has not reached the destination (step S6/NO), the server control unit 330 updates the current position information in the reference information database 323 to the current position information received as the in-vehicle device information (step S8).

Next, the server control unit 330 refers to the temporary vehicle ID included in the in-vehicle device information, and determines whether or not the temporary vehicle ID is the ID registered in the congestion prediction information database 325.

In the case where the temporary vehicle ID is the ID registered in the congestion prediction information database 325, the server control unit 330 generates the guide information including the congestion prediction information (step S9), and transmits the generated guide information to the in-vehicle device 10 which is the transmission origin of the in-vehicle device information (step S10).

In addition, in the case where the in-vehicle device information is not the current position information (step S5/NO), the server control unit 330 determines that the in-vehicle device information is the searched route information, and acquires the congestion prediction information from the congestion prediction information database 325 (step S11).

The server control unit 330 determines whether or not the searched route is the route to travel through the congestion occurrence section in the congestion occurrence time period based on the acquired congestion prediction information (step S12).

In the case of determining that the searched route is not to travel through the congestion occurrence section in the congestion occurrence time period (step S12/NO), the server control unit 330 generates the guide information notifying that the searched route does not include the congestion occurrence section (step S14). The server control unit 330 transmits the generated guide information to the in-vehicle device 10 which is the transmission origin of the in-vehicle device information (step S15).

Further, in the case of determining that the searched route is to travel through the congestion occurrence section in the congestion occurrence time period (step S12/YES), the server control unit 330 refers to the map data 321, and searches for the avoiding route which avoids the congestion occurrence section (step S13). Thereafter, the server control unit 330 generates the guide information including the section where the congestion occurrence is predicted, the congestion distance, the congestion probability and the information indicating the avoiding route or the like (step S14), and transmits the generated guide information to the in-vehicle device 10 which is the transmission origin of the in-vehicle device information (step S15).

FIG. 9 is the flowchart illustrating a procedure of congestion determination and congestion probability calculation. The procedure of the congestion determination and the congestion probability calculation will be described with reference to FIG. 9.

The server control unit 330 determines whether or not preset setting time has elapsed from the previous congestion determination and congestion probability calculation (step S21). In the case where the preset setting time has not elapsed, the server control unit 330 returns to the determination in step S21.

In the case where the preset setting time has elapsed (step S21/YES), the server control unit 330 acquires the route reference information from the reference information database 323 (step S22).

Next, the server control unit 330 selects a target section s and time period t (step S23), and calculates the congestion determination value T[t,s] for the selected section s and time period t (step S24). The congestion determination value T[t,s] is calculated by the expression (4) described above.

When the congestion determination value T[t,s] is calculated, the server control unit 330 determines whether or not the congestion is to occur in the selected section s and time period t, based on the expressions (5), (6) and (7) described above (step S25).

Then, the server control unit 330 calculates the ratio of the congestion determination value T[t,s] to the congestion reference value $T_{thresh}$, and calculates the congestion occurrence probability P[t,s] based on the calculated ratio and the expressions (8)-(14) described above (step S26).

Next, the server control unit 330 registers the determination result of the congestion occurrence and the congestion occurrence probability P[t,s] in the congestion prediction information database 325, and updates the congestion prediction information (step S27).

Then, the server control unit 330 determines whether or not the congestion occurrence is determined and the congestion occurrence probability P[t,s] is generated in all the preset time periods t and sections s (step S28).

In the case where the congestion occurrence is not determined and the congestion occurrence probability P[t,s] is not generated in all the preset time periods t and sections s (step S28/NO), the server control unit 330 returns to the processing in step S23. In addition, in the case where the congestion occurrence is determined and the congestion occurrence probability P[t,s] is generated in all the preset time periods t and sections s (step S28/YES), the server control unit 330 returns to the determination in step S21.

As described above, the congestion prediction server 30 of the present embodiment includes the communication unit 310, the storage device 320 and the server control unit 330.

The storage device 320 stores the determined route information of the determined route on which the vehicle 5 is scheduled to travel.

In the case of receiving the route information of the searched route searched by the in-vehicle device 10 loaded in the vehicle 5, the server control unit 330 generates the reference information regarding the congestion of the searched route based on the route information of the determined route, and transmits the generated reference information to the in-vehicle device 10.

Accordingly, since the reference information regarding the congestion of the searched route is generated based on the determined route information of the determined route on which the vehicle 5 is scheduled to travel, the congestion occurrence can be highly accurately predicted.

In the case of receiving the route information of the searched route, the server control unit 330 determines whether or not there is the occurrence section where the congestion occurrence is predicted in the searched route based on the determined route information of the determined route.

In addition, the server control unit 330 transmits the information regarding the occurrence section and the information of the avoiding route which avoids the occurrence section to the in-vehicle device 10 in the case where there is the occurrence section in the searched route, and transmits a guide indicating that the congestion occurrence is not predicted in the searched route to the in-vehicle device 10 in the case where there is not the occurrence section in the searched route.

Accordingly, the in-vehicle device 10 can select an optimum traveling route based on the information notified from the congestion prediction server 30.

The server control unit 330 detects the number of determined routes for which traveling through the section included in the searched route is scheduled, and determines whether or not the congestion occurrence is predicted in the section based on the detected number of the determined routes and the weighting factor indicating the easiness of the route change of the determined routes.

Accordingly, whether or not the section is the section where the congestion occurrence is predicted can be accurately determined.

The server control unit 330 sets the first weighting factor of the largest value as the weighting factor in the case where the determined route is the route of the automatic driving, in the case where the vehicle type of the vehicle 5 that travels on the determined route is the large vehicle, or in the case where the determined route is an unchangeable route.

In addition, in the case where the determined route is the route giving priority to the expressways, the server control unit 330 sets the second weighting factor of the value smaller than the first weighting factor.

Further, in the case where the determined route is the route giving priority to the general roads, the server control unit 330 sets the third weighting factor of the value smaller than the second weighting factor.

Accordingly, whether or not the section is the section where the congestion occurrence is predicted can be accurately determined.

The embodiment described above only illustrates one aspect of the present invention, and arbitrary modifications and applications are possible without departing from the spirit of the present invention.

For example, functional blocks of the congestion prediction server 30 illustrated in FIG. 3 are schematics for which the functions provided in the congestion prediction server 30 are classified according to main processing contents and illustrated, and are dividable into further more blocks according to the processing contents. In addition, the functional blocks may be configured to execute further more processing by one block illustrated in FIG. 3. Further, the processing of each block may be executed by one piece of hardware, or may be executed by a plurality of pieces of hardware. In addition, the processing of each block may be achieved by one program, or may be achieved by a plurality of programs.

Further, processing units in the flowcharts illustrated in FIG. 8 and FIG. 9 are divided according to the main processing contents in order to facilitate understanding of the processing of the server control unit 330 in the congestion prediction server 30, and the present invention is not limited by a dividing method or names of the processing units.

In addition, the processing of the server control unit 330 can be divided into further more processing units according to the processing contents, and can be divided such that one processing unit includes further more processing. Further, a processing order in the flowcharts described above is not limited to the illustrated example.

In addition, in the case of achieving the server control unit 330 in the congestion prediction server 30 by a computer, it is possible to configure the program to be executed by the computer in a form of a recording medium or a transmission medium which transmits the program. For the recording medium, a magnetic or optical recording medium or a semiconductor memory device can be used. Specifically, examples of the recording medium are a flexible disk, an HDD, a CD-ROM (Compact Disk Read Only Memory), a DVD, a Blu-ray® Disc and a magneto-optical disk. Further, the example of the recording medium is a portable or fixed type recording medium such as a flash memory or a card type recording medium. The recording medium may be a nonvolatile storage device such as a RAM, a ROM or an HDD, which is an internal storage device provided in a display device.

REFERENCE SIGNS LIST

1 Congestion prediction system
3 Communication network
5 Vehicle
10 In-vehicle device
30 Congestion prediction server
110 Mobile communication unit
120 GNSS reception unit
135 Touch panel
140 Voice processing unit
141 Speaker
143 Microphone
150 In-vehicle device control unit
160 Memory
161 Control program
163 Map data
170 Processor
171 Communication control unit
175 Position acquisition unit
177 Route search unit
179 Route determination unit
180 Bus
310 Communication unit
320 Storage device
321 Map data
323 Reference information database
325 Congestion prediction information database
330 Server control unit
340 Memory
345 Control program
350 Processor
351 Communication control unit
352 Data analysis unit
353 Route reference information creation unit
354 Congestion prediction unit
355 Congestion presence/absence determination unit
356 Avoiding route search unit
357 Guide vehicle specification unit
358 Guide information generation unit

What is claimed is:

1. An information processor comprising:
a communication unit having a transmitter and a receiver;
a memory; and
a processor that, in a case of receiving route information of a scheduled route on which a vehicle is scheduled to travel, makes the memory store the received route information of the scheduled route, and
in a case of receiving route information of a searched route searched by an in-vehicle device loaded in the vehicle, generates reference information regarding congestion of the searched route based on the route information of the scheduled route and transmit the generated reference information to the in-vehicle device,
wherein the processor detects the number of scheduled routes for which traveling through a section included in the searched route is scheduled, and
determines whether or not congestion occurrence in the section is predicted, based on the detected number of the scheduled routes and a weighting factor indicating easiness of route change of the scheduled routes.

2. The information processor according to claim 1, wherein the processor
determines, in the case of receiving the route information of the searched route, whether or not there is an occurrence section where congestion occurrence is predicted in the searched route based on the route information of the scheduled route,
transmits, in a case where there is the occurrence section in the searched route, information regarding the occurrence section and information of an avoiding route which avoids the occurrence section to the in-vehicle device, and
transmits, in a case where there is not the occurrence section in the searched route, a guide indicating that the congestion occurrence is not predicted in the searched route to the in-vehicle device.

3. The information processor according to claim 1, wherein the processor sets a first weighting factor of a largest value as the weighting factor in a case where the scheduled route is a route of automatic driving, in a case where a vehicle type of the vehicle that travels on the scheduled route is a large vehicle, or in a case where the scheduled route is an unchangeable route,
sets a second weighting factor of a value smaller than the first weighting factor in a case where the scheduled route is a route giving priority to expressways, and
sets a third weighting factor of a value smaller than the second weighting factor in a case where the scheduled route is a route giving priority to general roads.

* * * * *